United States Patent [19]

Kim

[11] Patent Number: 5,193,021

[45] Date of Patent: Mar. 9, 1993

[54] FILM SPACER AND METHOD FOR FABRICATING LIQUID CRYSTAL CELL USING THE SAME

[75] Inventor: Byunghee Kim, Seoul, Rep. of Korea

[73] Assignee: Samsung Electron Device Co., Ltd., Kyunggi-Do, Rep. of Korea

[21] Appl. No.: 781,088

[22] Filed: Oct. 21, 1991

[30] Foreign Application Priority Data

Dec. 22, 1990 [KR] Rep. of Korea .................. 90-21553

[51] Int. Cl.$^5$ .................. G02F 1/1339; G02F 1/1335
[52] U.S. Cl. .......................... 359/81; 359/62
[58] Field of Search .................. 359/81, 62

[56] References Cited

U.S. PATENT DOCUMENTS 4,682,858  7/1987  Kanbe et al. ..................... 359/81

FOREIGN PATENT DOCUMENTS 0002130  1/1986  Japan .................. 359/81
0165726  7/1986  Japan .................. 359/81
1-196020  8/1989  Japan .
3168613  7/1991  Japan .................. 359/62

*Primary Examiner*—William L. Sikes
*Assistant Examiner*—Anita Pellman Gross
*Attorney, Agent, or Firm*—Christie, Parker & Hale

[57] ABSTRACT

A film spacer is formed by individual spacers in strip form which a cover layer covers. To fabricate a liquid crystal cell using the film spacer, the spacer is cut longitudinally to partially form the strips and supported on one side of a lower glass panel. The spacer and panel are portioned to enable a liquid crystal path to be formed between each extending end of the strips and a sealant to be subsequently applied around the periphery of the one side of the lower glass panel. The individual spacers are separated by cutting the blank area from the film spacer at the ends of the strips. The cover layer is removed, while keeping the arrangement of a plurality of spacers and removing only spacers covering desired display areas of the lower panel. A sealant is then provided around the lower glass panel. An upper glass panel is sealed to the lower panel with the spacers inbetween, and liquid crystal is infused through the entrance.

11 Claims, 2 Drawing Sheets

FILM SPACER AND METHOD FOR FABRICATING LIQUID CRYSTAL CELL USING THE SAME

FIELD OF THE INVENTION

The present invention relates to a new structure of a liquid crystal cell, and more in particular to a film spacer and a method for fabricating a liquid crystal cell using the same.

BACKGROUND OF THE INVENTION

Film spacers are interposed between upper and lower glass panels, whose perimeters are sealed to form a cell into which a liquid crystal is infused Thus, a liquid crystal display element is formed.

Conventionally, glass fiber or plastic balls have been used as spacers. They are dispersed by a spacer sprayer in equal amounts on the upper or lower panel, along with a solvent, and then the panels are joined with the spacers between them.

The gap between the upper and lower panels is critical, as it has an influence on a display area quality. Glass fiber or plastic balls do not maintain a constant cell gap, owing to nonuniformities in size and distribution. In the case of a STN(super twisted nematic) liquid crystal display element having a twist angle of more than 180 degrees, even a minute variation in cell gap has a noticeable influence on the display quality.

Japanese Laid-Open Patent(Kokai) No. 89-196020 reveals a plastic liquid crystal cell using film as spacers interposed between the upper and lower panels. In this case, the spacers are in the form of strips disposed only in the nondisplay areas. However it is not easy to properly position the thin and long spacers arranged on the upper and lower glass substrates.

SUMMARY OF THE INVENTION

The present invention provides a film spacer and a method for fabricating a liquid crystal cell using the same. More specially, the present invention provides a spacer sheet with one end that is blank. The spacer also has a plurality of incised lines equally formed at uniform intervals extending from the blank area to the other end. An cover layer is positioned on the one side of the sheet, whose one end is attached to the blank area, and the other end rests on a plurality of spacers divided in the strip form and equally arranged.

Also, the present invention proposes a method for fabricating a liquid crystal cell using the film spacer, including the steps of covering the sheet with a lower glass panel having a ITO layer deposited and oriented by rubbing according to a conventional method by positioning the panel to allow a liquid crystal path to be subsequently formed between each extending end of the spacers and an end wall formed by sealant; separating the plurality of spacers formed by the incised lines and the cover layer while keeping the arrangement of a plurality of spacers; selectively removing only those spacers covering display areas of the lower panel; printing a sealant around the lower glass panel according to a conventional method; and overlapping an upper glass panel on the lower glass panel with the spacer between.

BRIEF DESCRIPTION OF THE DRAWINGS

Further features and advantages of the present invention will be apparent in the following detailed description in connection with the accompanying drawings, in which.

DESCRIPTION OF THE PREFERRED INVENTION

Figure 1:
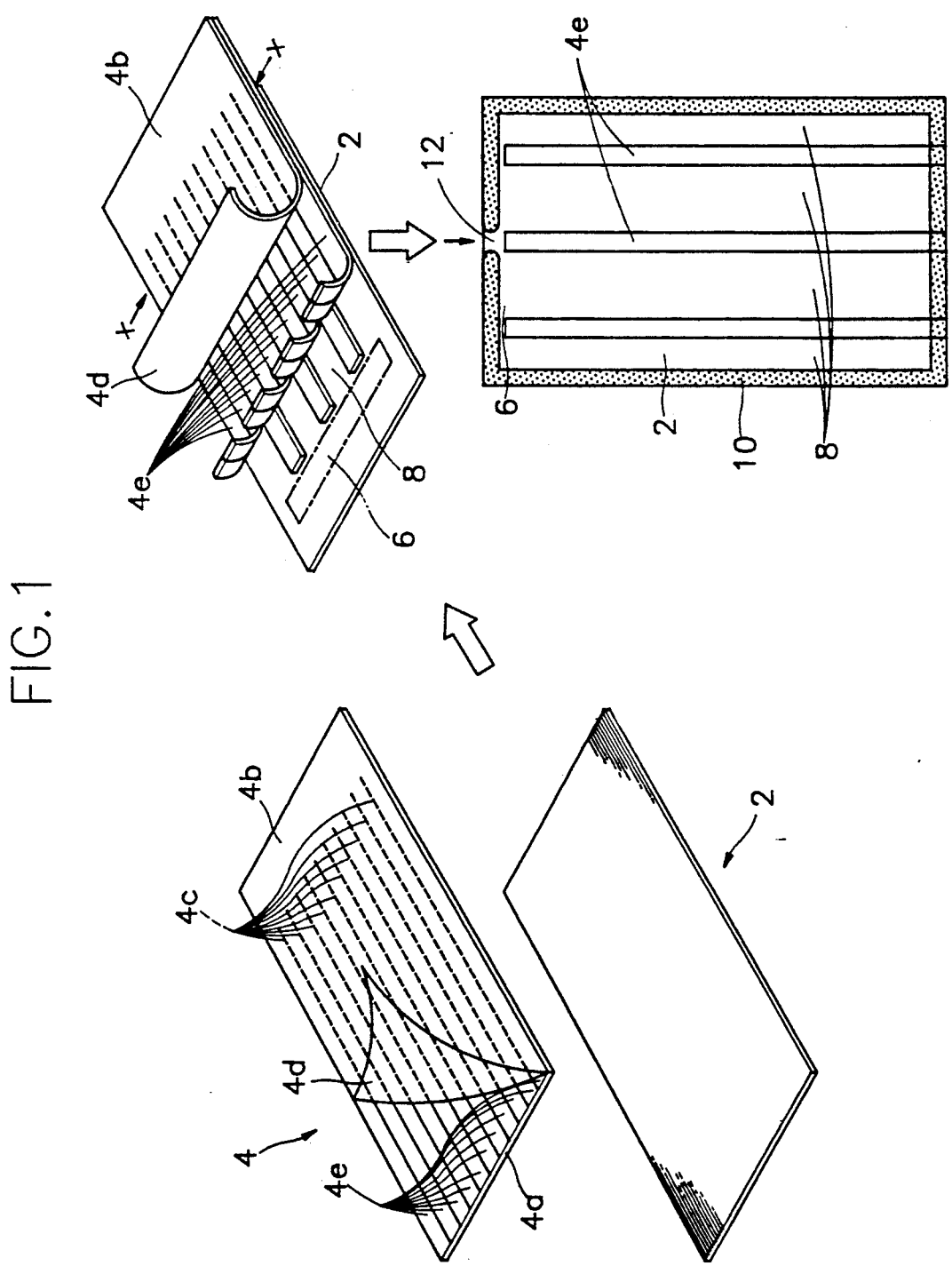
FIG. 1 is a flow diagram showing successive steps in a method for fabricating a liquid crystal cell according to the present invention.

FIG. 1 illustrates a lower glass panel 2 where an ITO layer and a layer are deposited, and then an orienting process is performed on these layers again. A film spacer 4 is made of an oriented polyethylene terephalate (PET) sheet 4a (such as MYLER TM, a registered trademark of E. I. duPont de Nemours & Co. of Wilmington, Del.) with one blank end area 4b, and a plurality of lines 4c representing equal cuts at uniform pitch. The cuts extend from the blank area to the other end of the sheet. A cover layer 4d is fixed to the one side of sheet 4a at blank area 4b, and the remainder rests on a plurality of spacers 4e divided in strip form and equally arranged. Film spacer 4 is then positioned on the oriented layer of panel 2.

In creating this liquid crystal cell, it is best to infuse liquid crystal in a direction that corresponds to the longitudinal direction of the spacers 4e, so that the infusion process is smooth. In addition, the film spacer 4 should be positioned on the panel 2 such that the other end of each of the spacers 4e is at an appropriate interval from one end of panel 2 to leave sufficient room for a liquid crystal path 6 defined between the end of the spacers and cell sidewalls subsequently to be formed by a sealant.

After covering the film spacer 4 with the panel 2, the entire blank 4b, which has been positioned to extend beyond the end of lower panel 2, is cut along line X—X, shown in FIG. 1. Cover layer 4d is removed to reveal the spacers 4e on the lower panel 2. Thus, the particular spacers 4e, shown covering desired display areas 8, can then be selectively removed.

After that, a conventional sealant 10 is printed along the edges of the lower panel 2. It is preferable that the extending end of one of the spacers 4e is used as a guide to position an infusion entrance 12 opposite it, so that providing a conventional infusion barrier can be omitted.

Figure 2:
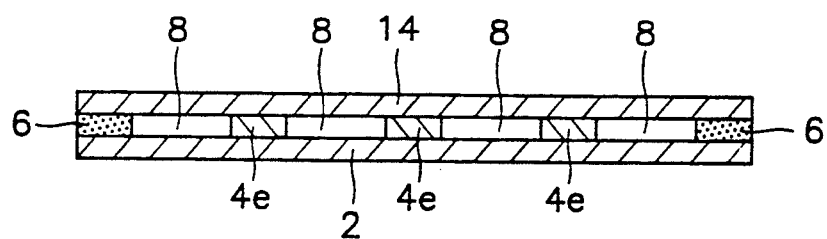
FIG. 2 is a side sectional view of the resultant liquid crystal cell according to the present invention.

An upper glass panel 14 positioned over lower panel 2 to and sealed to it by sealant 10 to form a liquid crystal cell, as show in FIG. 2. A liquid crystal subsequently is infused into the cell, thereby completing a liquid crystal display element.

The liquid crystal display element obtained through the present invention has a plurality of spacers 4e interposed between the upper and lower glass panels 2, 14, so that they divide spaces and maintain an equal cell gap. The liquid crystal is infused into these spaces to form a typical liquid crystal display element.

A liquid crystal display element formed according to the present invention has a much more uniform and accurate cell gap than a display element using a former spacer. In addition, the present invention provides a simple 2 and then removing sequentially a cover layer 4d and spacers 4e covering display areas, so that a conventional equipment can be used.

What is claimed is:

1. A film spacer for a liquid crystal display element comprising:

a PET sheet with one end having a blank area and through which a plurality of incised lines are formed at intervals, the lines starting at the blank area and extending to the other end of the sheet; and a cover layer on one side of the sheet, the cover layer being fixed to the blank area, wherein the incised lines form the film spacer into a plurality of spacers arranged in strip form.

2. The film spacer of claim 1, wherein the intervals are uniform, and the lines are of equal length.

3. A method of fabricating a liquid crystal cell comprising the steps of:

a) providing a spacer sheet and cutting a plurality of slices through the sheet, the slices having first and second ends, the second ends extending to one edge of the sheet;

b) putting a cover over one side of the sheet;

c) supporting another side of the sheet on a first glass panel;

d) cutting the sheet such that the first ends of the slices are aligned with an edge of the first glass panel, thereby forming the sheet into separate strips defined by the slices;

e) removing the cover and at least one of the separate strips to leave predetermined ones of the separate strips; and f) completing the cell by sealing a second glass panel to the first glass panel with the predetermined strips inbetween, and infusing liquid crystal.

4. The method of claim 3, wherein the spacer sheet comprises PET.

5. The method of claim 3, wherein the slices are formed such that their first ends fall short of an edge of the sheet opposite to the one edge of the sheet, thereby forming an unsliced area of the sheet at the opposite edge.

6. The method of claim 5, wherein the slices are formed such that the first ends form a line parallel to the opposite edge of the sheet, and wherein the slices are parallel to each other and uniformly spaced.

7. The method of claim 5, wherein in the step of putting the cover over one side of the sheet, the cover is attached to the unsliced area of the sheet.

8. The method of claim 5, wherein in step d) of cutting the sheet, the unsliced area is cut from the sheet by cutting through the first ends of the slices.

9. The method of claim 3, wherein the liquid crystal cell has predetermined display areas, and the step of removing the cover and at least one of the separate strips is performed by removing those strips which correspond to the predetermined display areas.

10. The method of claim 3, wherein in the step of completing the cell, an aperture for infusion of liquid crystal is provided in a position opposite to an end of one of the predetermined strips.

11. The method of claim 3, wherein in the step of supporting another side of the sheet on the first glass panel, the second ends of the slices are positioned a predetermined distance from another edge of the first glass panel, so as to form a space in communication with each display area.

* * * * *